US012710855B2

(12) United States Patent
Bignumb-Bi-Kumb

(10) Patent No.: US 12,710,855 B2
(45) Date of Patent: Aug. 18, 2026

(54) ACQUIRING VEHICLE INFORMATION AND DISPLAYING THE ACQUIRED VEHICLE INFORMATION IN A CODE

(71) Applicant: TOYOTA JIDOSHA KABUSHIKI KAISHA, Aichi-ken (JP)

(72) Inventor: Boris Kurtis Bignumb-Bi-Kumb, Tokyo (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 201 days.

(21) Appl. No.: 18/666,817

(22) Filed: May 17, 2024

(65) Prior Publication Data

US 2025/0355537 A1 Nov. 20, 2025

(51) Int. Cl.

*G06F 3/0482* (2013.01)
*G06F 3/0484* (2022.01)
*G06K 19/06* (2006.01)

(52) U.S. Cl.

CPC .......... *G06F 3/0482* (2013.01); *G06F 3/0484* (2013.01); *G06K 19/06037* (2013.01)

(58) Field of Classification Search

CPC .................... G06F 3/0482
USPC .................... 715/765
See application file for complete search history.

(56) References Cited

U.S. PATENT DOCUMENTS 6,874,680 B1 * 4/2005 Klaus .................... G06F 8/65 235/375
9,708,953 B1 * 7/2017 Szailer .................. F01N 3/2066
12,065,089 B1 * 8/2024 Maksimov ............ H04W 4/203
12,412,432 B1 * 9/2025 Mahida .................. G07C 5/006
2002/0077779 A1 * 6/2002 Liebl .................... G01R 31/319 702/183
2002/0077781 A1 * 6/2002 Liebl .................... G06F 3/0481 702/183
2003/0097211 A1 * 5/2003 Carroll .................. H04L 67/565 701/32.6
2006/0101311 A1 * 5/2006 Lipscomb ............. G07C 5/008 714/47.1
2014/0089078 A1 * 3/2014 Dessert .............. G06Q 30/0238 705/14.38
2014/0100738 A1 * 4/2014 Itatsu .................. G07C 5/0825 701/33.4
2014/0150541 A1 * 6/2014 Chiffey ................ F01N 11/00 73/114.75
2018/0286143 A1 * 10/2018 Deshmukh ............ G07C 5/006
2019/0042789 A1 * 2/2019 Hartkopp ............ G06F 21/6245
2019/0056902 A1 * 2/2019 Batten .................. G06V 20/62

(Continued)

FOREIGN PATENT DOCUMENTS

CN 109948763 A 6/2019
JP 2006-507549 A 3/2006
JP 2022-164620 A 10/2022

*Primary Examiner* — Reza Nabi

(74) *Attorney, Agent, or Firm* — HAUPTMAN HAM, LLP

(57) ABSTRACT

A method for acquiring vehicle information. A menu is presented in a user interface of an infotainment system of a vehicle for acquiring vehicle information. Vehicle information is selected via the menu to obtain from memory associated with at least one electronic control unit. Vehicle information obtained based on the selecting of the vehicle information via the menu is received. A code is generated having the vehicle information embedded therein. The code having the vehicle information embedded therein is displayed.

15 Claims, 10 Drawing Sheets

(56) References Cited

U.S. PATENT DOCUMENTS

| | | | | |
|---|---|---|---|---|
| 2019/0122543 | A1* | 4/2019 | Matus | G08G 1/0133 |
| 2019/0217724 | A1* | 7/2019 | Erb | B60K 6/48 |
| 2019/0272755 | A1* | 9/2019 | Giorgi | H04W 4/40 |
| 2020/0175786 | A1* | 6/2020 | Bongers | G06Q 40/08 |
| 2020/0273262 | A1* | 8/2020 | Dudar | G07C 5/0841 |
| 2020/0302711 | A1* | 9/2020 | Lewis | G06F 16/955 |
| 2020/0364958 | A1* | 11/2020 | Lewis | G07C 5/0808 |
| 2021/0160365 | A1* | 5/2021 | Pearce | H04W 4/12 |
| 2021/0375076 | A1* | 12/2021 | Scotland | G07C 5/0825 |
| 2022/0089172 | A1* | 3/2022 | Antholzner | B60W 20/50 |
| 2022/0169258 | A1* | 6/2022 | Samarthyam | G06N 3/0475 |
| 2022/0332189 | A1* | 10/2022 | Lyons | G06F 3/04817 |
| 2023/0143357 | A1* | 5/2023 | Sanderson | G06Q 20/204<br>235/494 |
| 2023/0222853 | A1* | 7/2023 | Rich | G07C 5/008<br>701/29.6 |
| 2023/0282033 | A1* | 9/2023 | Duan | G07C 5/006<br>701/29.6 |
| 2024/0053738 | A1* | 2/2024 | Wang | G05B 19/042 |
| 2024/0075948 | A1* | 3/2024 | Hamada | B60K 35/10 |
| 2024/0367514 | A1* | 11/2024 | Deuel | B60K 35/00 |

* cited by examiner

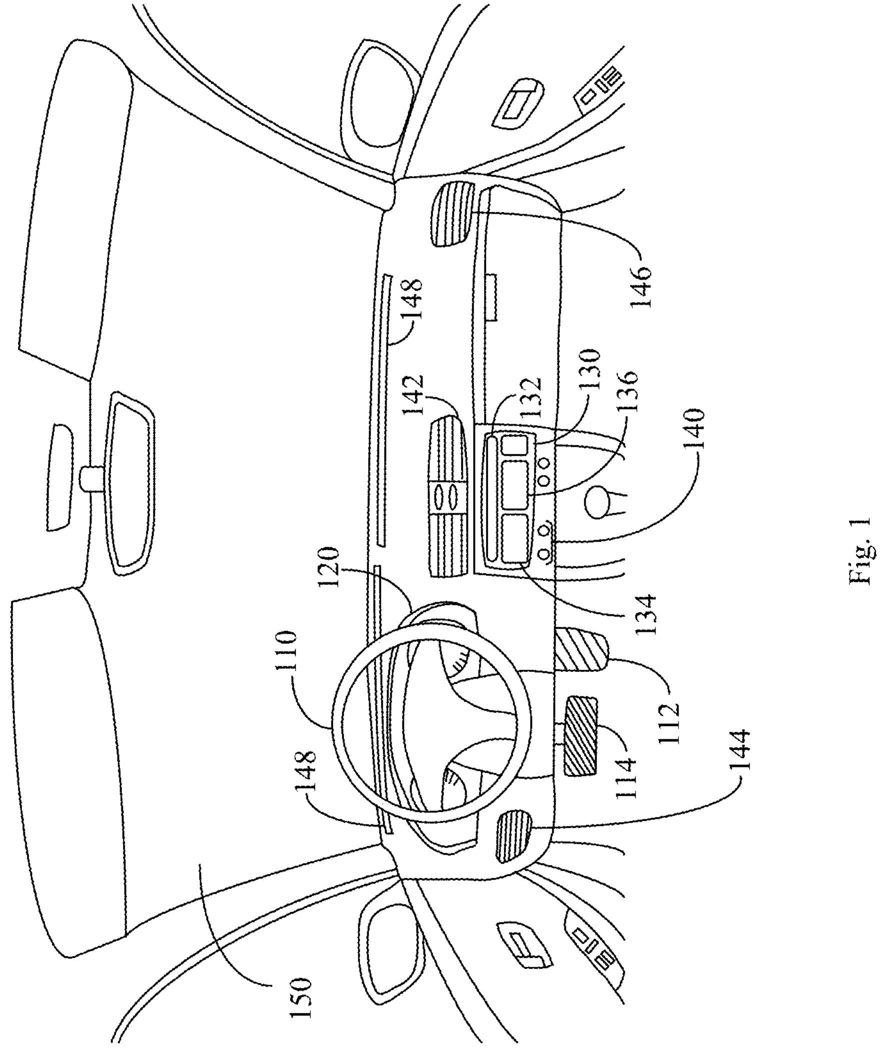
Fig. 1

ACQUIRING VEHICLE INFORMATION AND DISPLAYING THE ACQUIRED VEHICLE INFORMATION IN A CODE

TECHNICAL FIELD

This description relates to acquiring vehicle information and displaying the acquired vehicle information in a code, and method of using the same.

BACKGROUND

Advanced and expensive equipment is used to acquire vehicle information representing the state of the vehicle. An electronic control unit (ECU), also known as an electronic control module (ECM), is an embedded system in automotive electronics that controls one or more of the electrical systems or subsystems in a car or other motor vehicle. Modern vehicles have many ECUs, and these can include some or all of the following: engine control module (ECM), powertrain control module (PCM), transmission control module (TCM), brake control module (BCM or EBCM), central control module (CCM), central timing module (CTM), general electronic module (GEM), body control module (BCM), and suspension control module (SCM). Vehicles have an increasing number of ECUs as a transition continues from a more mechanical type of cars to more electronics-based cars.

On-board diagnostics (OBD) refers to a vehicle's self-diagnostic and reporting capability. In the United States, OBDs are used to comply with Federal Emissions standards to detect failures that may increase the vehicle tailpipe emissions. A primary benefit of this is that OBD systems give the vehicle owner or repair technician access to the status of the various vehicle sub-systems. An OBD allows a technician to plug into the vehicle to obtain useful information stored into memories. However, with new models of vehicles, the architecture of different vehicles is different. The current solution of using OBD does not allow data generations with evolving architectures. Current methods are difficult to use to acquire vehicle information.

SUMMARY

In at least embodiment, a method for acquiring vehicle information includes presenting a menu in a user interface of an infotainment system of a vehicle for acquiring vehicle information, selecting, via the menu, vehicle information to obtain from a memory associated with at least one electronic control unit of a vehicle, receiving vehicle information obtained based on the selecting the vehicle information, generating a code having the vehicle information embedded therein, and displaying the code having the vehicle information embedded therein.

In at least one embodiment, a system for acquiring vehicle information includes a memory storing computer-readable instructions, and a processor connected to the memory, wherein the processor is configured to execute the computer-readable instructions to present a menu of an infotainment system of a vehicle for acquiring vehicle information, receive, via the menu, a selection of vehicle information to obtain from memory associated with at least one electronic control unit, receive vehicle information obtained based on the selection of the vehicle information, generate a code having the vehicle information embedded therein, and displaying the code having the vehicle information embedded therein.

In at least one embodiment, a non-transitory computer-readable media having computer-readable instructions stored thereon, which when executed by a processor causes the processor to perform operations including presenting a menu in a user interface of an infotainment system of a vehicle for acquiring vehicle information, selecting, via the menu, vehicle information to obtain from memory associated with at least one electronic control unit, receiving vehicle information obtained based on the selecting the vehicle information, generating a code having the vehicle information embedded therein, and displaying the code having the vehicle information embedded therein.

BRIEF DESCRIPTION OF THE DRAWINGS

Aspects of the present disclosure are best understood from the following detailed description when read with the accompanying figures. It is noted that, in accordance with the practice in the industry, various features are not drawn to scale. In fact, the dimensions of the various features are able to be increased or reduced for clarity of discussion.

FIG. 1 illustrates a vehicle cockpit according to at least one embodiment.

DETAILED DESCRIPTION

Figure 2:
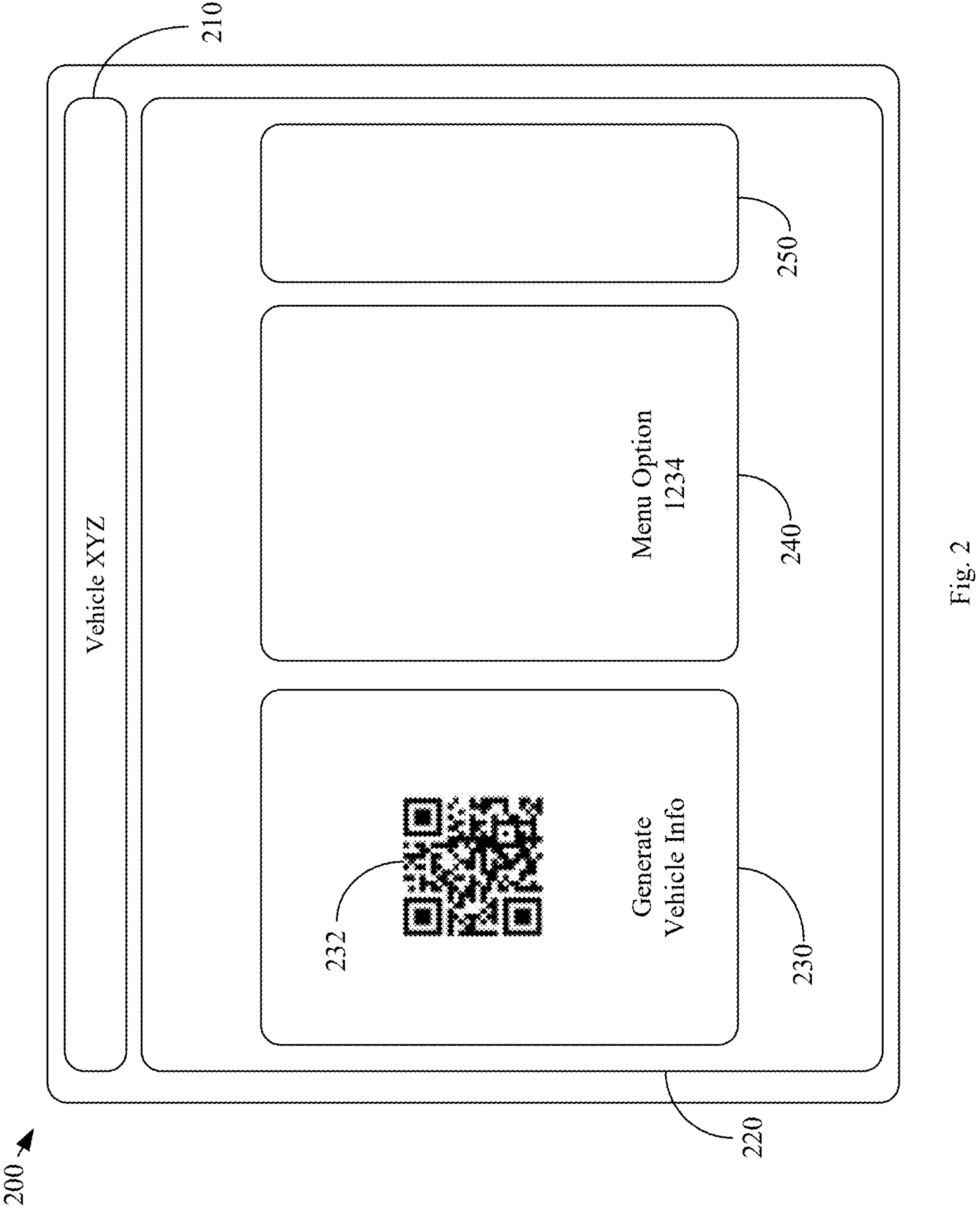
FIG. 2 illustrates a User Interface with options for different menu selections according to at least one embodiment.

Embodiments described herein describe examples for implementing different features of the provided subject matter. Examples of components, values, operations, materials, arrangements, or the like, are described below to simplify the present disclosure. These are, of course, examples and are not intended to be limiting. Other components, values, operations, materials, arrangements, or the like, are contemplated. For example, the formation of a first feature over or on a second feature in the description that follows include embodiments in which the first and second features are formed in direct contact and include embodiments in which additional features are formed between the first and second features, such that the first and second features are unable to make direct contact. In addition, the present disclosure repeats reference numerals and/or letters in the various examples. This repetition is for the purpose of simplicity and clarity and does not in dictate a relationship between the various embodiments and/or configurations discussed.

Further, spatially relative terms, such as "beneath," "below," "lower," "above," "upper" and the like, are used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus is otherwise oriented (rotated 90 degrees or at other orientations) and the spatially relative descriptors used herein likewise are interpreted accordingly.

In at least one embodiment, a method for acquiring vehicle information includes presenting a menu in a user interface of an infotainment system of a vehicle for acquiring vehicle information, selecting, via the menu, vehicle information to obtain from a memory associated with at least one electronic control unit of a vehicle, receiving vehicle information obtained based on the selecting the vehicle information, generating a code having the vehicle information embedded therein, and displaying the code having the vehicle information embedded therein.

Embodiments described herein provide a method that provides one or more advantages. For example, an Infotainment System provides menus for a user to select vehicle information to acquire. A Presets Menu allows a user to acquire a collection of preset information. A Custom Menu allows a user to select from a listing of parameters vehicle information to acquire. Once the information has been obtained, a code is generated and presented on a display, wherein the code includes the acquired vehicle information. Further, the operation is able to be started on each of a plurality of vehicles, such as in a vehicle fleet, and the user does not have to wait until information on a first vehicle is obtained before triggering acquisition of vehicle information on subsequent vehicles. The information is able to then be collected from each vehicle at once in quick succession.

FIG. 1 illustrates a vehicle cockpit 100 according to at least one embodiment.

In FIG. 1, the vehicle cockpit includes Steering Wheel 110, Accelerator Pedal 112, Brake Pedal 114, Instrument Panel 120, Infotainment System 130, and Climate Control System 140. Climate Control System 140 is also sometimes referred to as the Heating, Ventilation, and Air Conditioning (HVAC) System. Infotainment System 130 includes any type of infotainment system of a vehicle having an interactive display. The Steering Wheel is the part of the steering system that is manipulated by the driver to control the steering system and the direction of the vehicle. By manipulating the Steering Wheel 110 the driver directs the direction of the vehicle through a linkage system to the front wheels. The Accelerator Pedal 112 is used to control fuel and air supply to the engine by application of pressure. Accelerator Pedal 112 is also known as the throttle or gas pedal. The Brake Pedal 114 is pressed to apply the brakes, which cause the vehicle to slow down and/or stop.

Instrument Panel 120 is the portion of the dashboard which is positioned behind the Steering Wheel 110. The Instrument Panel 120 includes various gauges and lights that update the driver on the status of the vehicle. For example, Instrument Panel 120 often includes traction control indicators, engine temperature, tachometer, a fuel gauge, a speedometer, an odometer, turn indicators, gear display, various warning lights, and the like. The tachometer displays the rotation of the engine's crankshaft in revolutions per minute (RPM). The speedometer shows the speed of the vehicle. The odometer shows you the total number of miles traveled since you started driving the car. The fuel gauge shows you how much fuel is left in the vehicle. The temperature gauge indicates the current engine temperature. Alternatively, a designated light is able to be included to warn about engine temperature issues, such as engine overheating. Turn indicators represent flashing lights on either side of the vehicle to communicate to other drivers the direction that the driver intends to turn. A gear display or gear position indicators shows the gear that is currently engaged, e.g., park, neutral, drive, and the like. Warning lights communicate different status items of the vehicle. Vehicles have various features like ESC and ABS pre-installed, not to mention the more standard components or elements. Warning lights are illuminated briefly upon startup as the vehicle checks to ensure the systems are safe and ready for operation. Occasionally one warning light might stay on, indicating a problem, e.g., the engine, headlights, temperature, and the like.

Infotainment System 130 is a combination of information plus entertainment. An Infotainment System 130 is a collection of hardware and software in vehicles that provides audio and video entertainment/information. Infotainment System 130 includes any type of infotainment system of a vehicle having an interactive display. According to at least one embodiment, Infotainment System 130 presents a User Interface for a menu that allows users to generate information associated with the vehicle. The User Interface is able to present a Title Bar 132 that provides an indicator of the current menu. Menu options 134, 136 are presented for selection to generate vehicle information that leads the user to different vehicle information generations operations. For example, menu options 134, 136 include a selector for selection of a Presets Menu and a selector for selection of a Custom Menu.

Climate Control System 140 includes controls for setting the temperature of the interior of the vehicle and for setting operation of the Climate Control System 140, e.g., air conditioning, heating, defrosting, floor vents, defrost vents, occupant vents, and combinations thereof. For example, vents that are located at different positions in the vehicle, e.g., vent 142 for providing central air flow, vent 144 for proving air flow toward the driver, vent 146 for providing air flow toward a passenger, and vent 148 on the top of the dash for defrosting the windshield 150. Additional vents are able to be positioned in different areas of the vehicle, e.g., in the back seat area, underneath the dash, and the like.

FIG. 2 illustrates a User Interface 200 with options for different menu selections according to at least one embodiment.

User Interface 200 includes Title Bar 210 that provides an indicator of the current menu. In FIG. 2, the Title Bar 210 indicates a menu for Vehicle XYZ. User Interface 200 includes a Display Area 220 for the display of additional menu options. User Interface 300 is provided, for example, as part of an Infotainment System, wherein the Infotainment System includes any type of infotainment system of a vehicle having an interactive display. Within Display Area 220, a Vehicle Information Generation Menu 230 is displayed for selecting to generate vehicle information. Vehicle information is provided by a code, such as a two dimensional barcode (also referred to as "QR code") 232. Display Area 220 is also able to display Menu Options 240 as well as other menu options 250.

Figure 3:
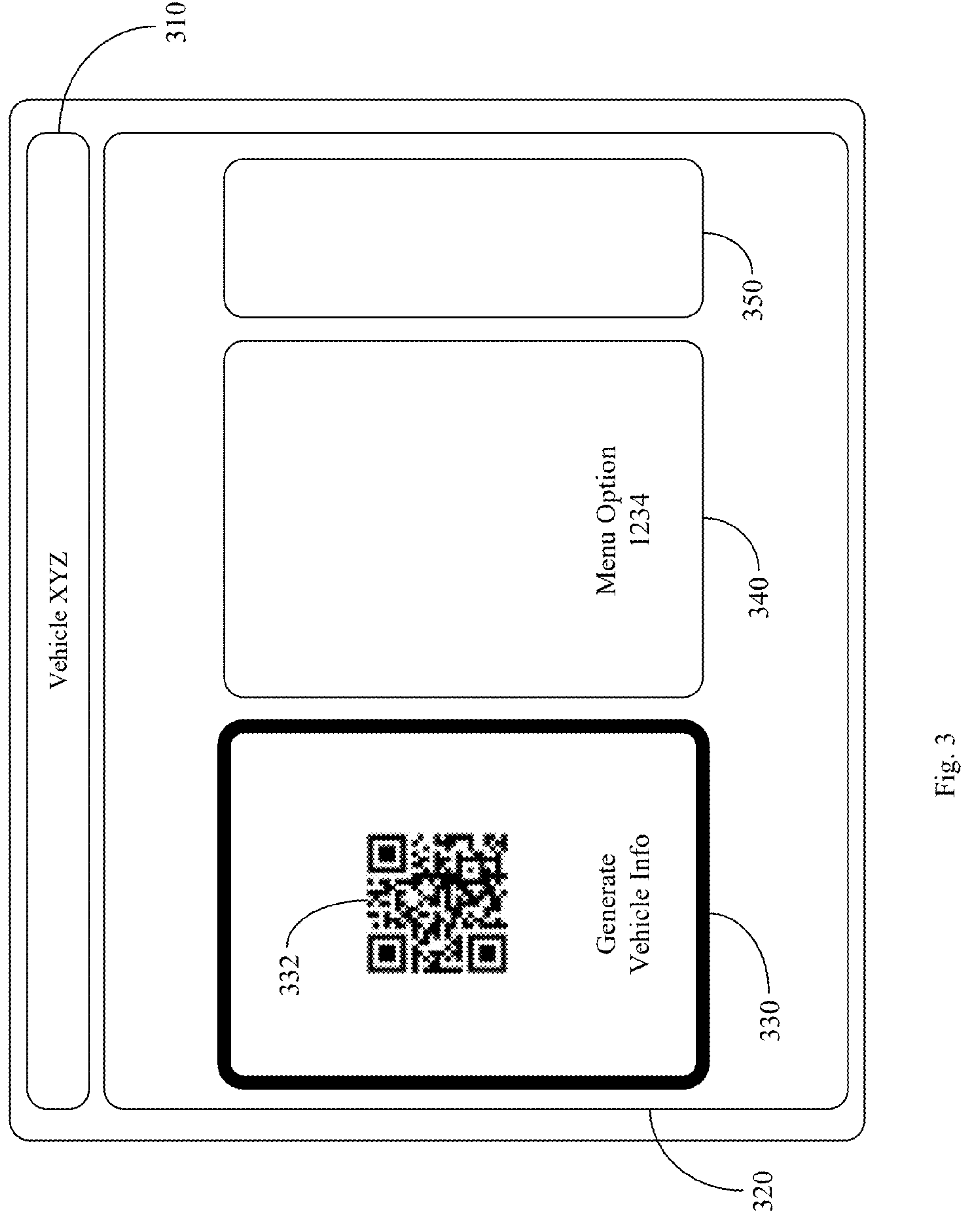
FIG. 3 illustrates User Interface for initiation of generating vehicle information according to at least one embodiment.

FIG. 3 illustrates User Interface 300 for initiation of generating vehicle information according to at least one embodiment.

In FIG. 3, User Interface 300 includes Title Bar 310 that provides an indicator of the current menu. The Title Bar 310 indicates a menu for Vehicle XYZ. User Interface 300 again shows the Display Area 320 for the display of additional menu options. Within Display Area 320, Vehicle Information Generation Menu 330 is shown being selected (as represented by the border being highlighted) for initiating generation of vehicle information. Vehicle information is provided by a code, such as a two dimensional barcode 332. Again, Display Area 320 is also able to display Menu Options 340 as well as other menu options 350.

Figure 4:
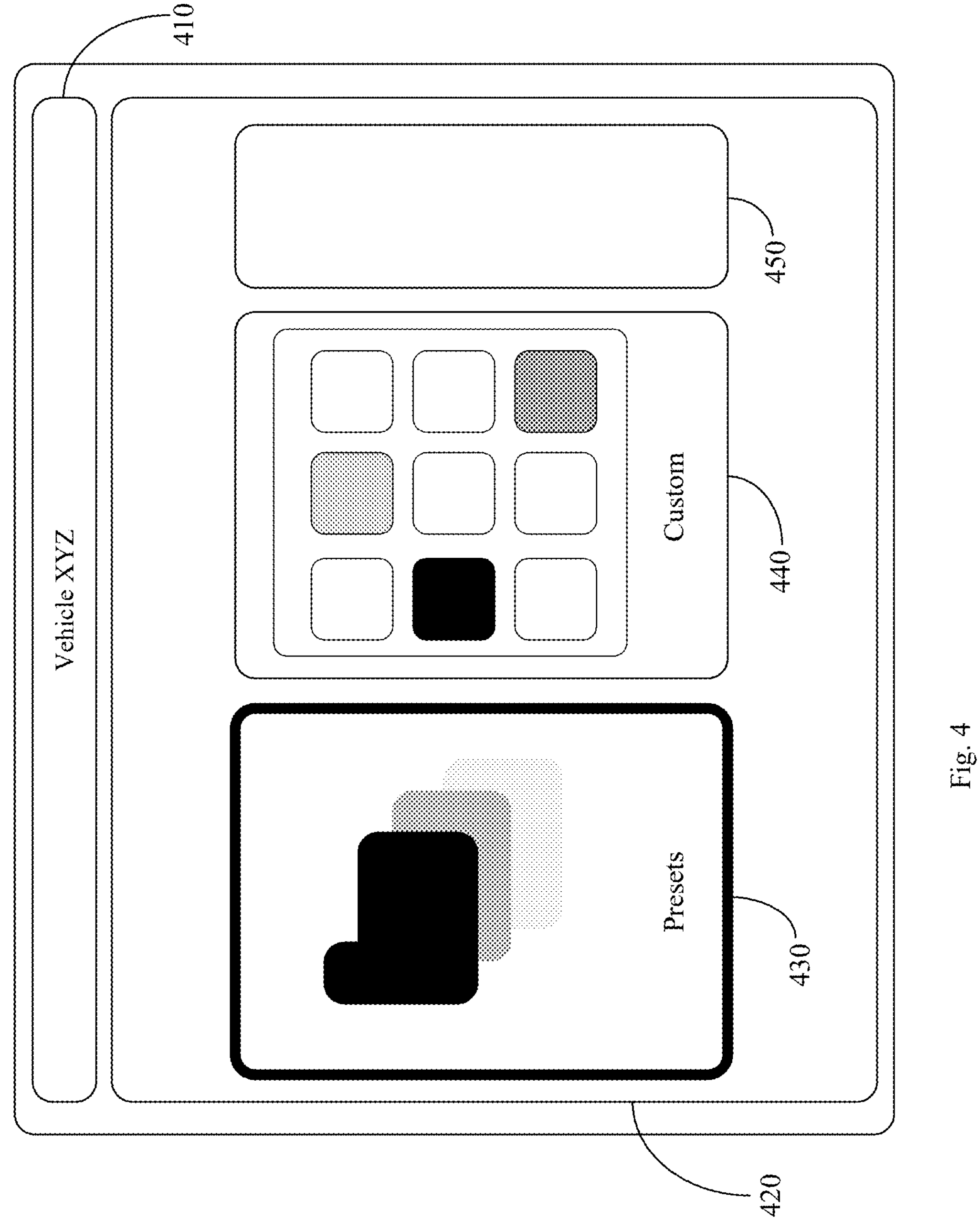
FIG. 4 illustrates a Menu for selecting options for generating vehicle information according to at least one embodiment.

FIG. 4 illustrates a Menu 400 for selecting options for generating vehicle information according to at least one embodiment.

In FIG. 4, Menu 400 is displayed after selecting the Vehicle Information Generation Menu 330 as described above with reference to FIG. 3. Menu 400 includes Title Bar 410 that provides an indicator of the current menu. The Title Bar 410 indicates a menu for Vehicle XYZ. Within Display Area 420, a Presets Generation Menu 430 is displayed for selection by a user to generate vehicle information in a code, such as a two dimensional barcode, based on preset parameters. A Custom Generation Menu 440 is displayed for selection by a user to generate vehicle information, in a code, such as a two dimensional barcode, based on selection of custom parameters. Again, Display Area 420 is also able to display other menu options 450.

Figure 5:
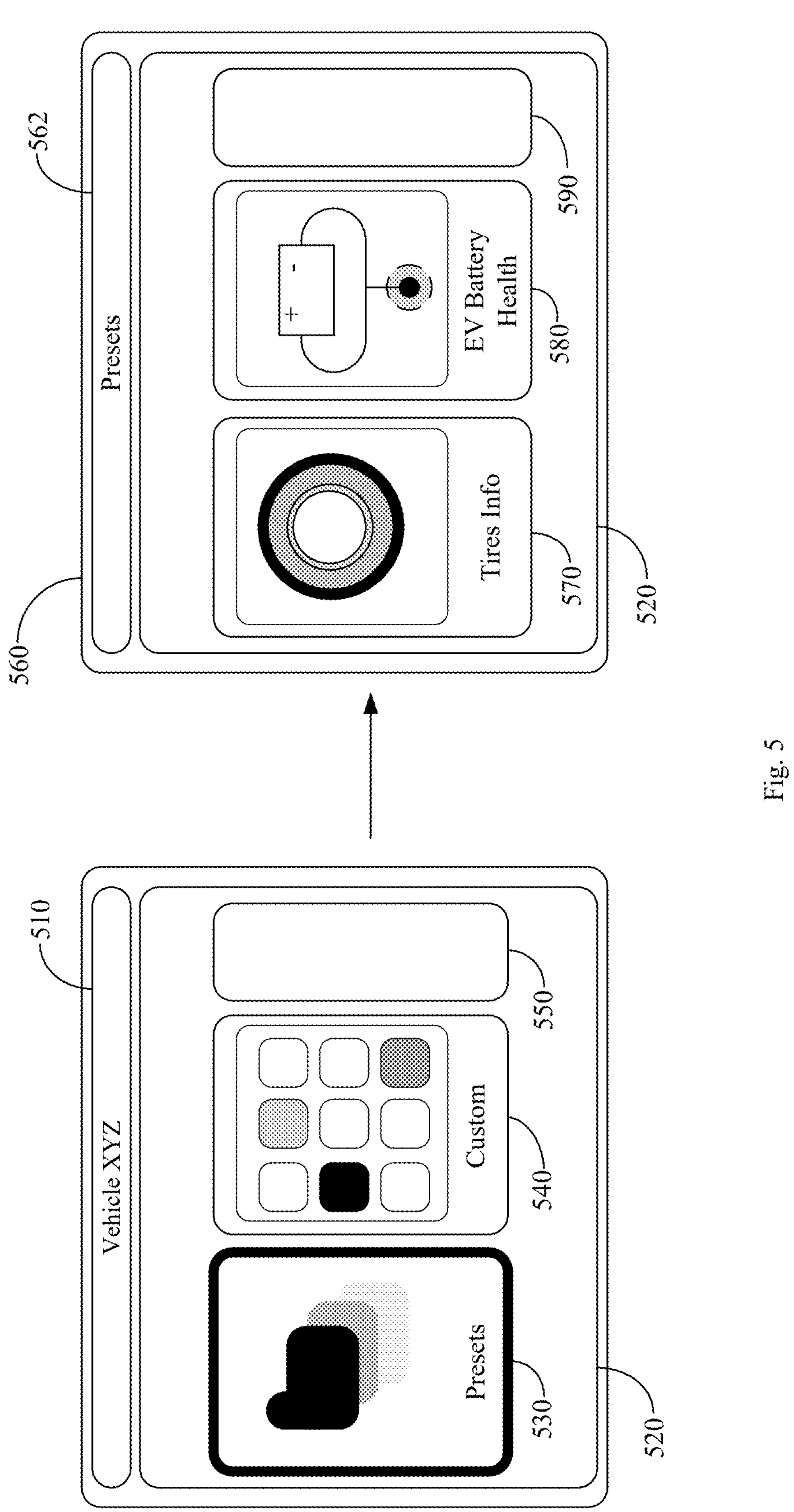
FIG. 5 illustrates a transition to a Presets Menu according to at least one embodiment.

FIG. 5 illustrates a transition to a Presets Menu 500 according to at least one embodiment.

In FIG. 5, the Presets Generation Menu 530 is shown selected as represented by the border of the Presets Generation Menu 530 being highlighted. Title Bar 510 indicates a menu for Vehicle XYZ. Within Display Area 520, a Presets Generation Menu 530 is displayed as being selected for displaying the Presets Options Menu 560. Display Area 520 also shows Custom Generation Menu selector 540, which is unselected, as well as other menu options 550.

Upon selection of Presets Generation Menu 530, Presets Options Menu 560 is displayed. Presets Options Menu 560 includes a Title Bar 562 identifying navigation to the menu for selection of Presets. Presets Options Menu 560 includes Display Area 520 of Presets Options Menu 560 showing a collection of preestablished information that the manufacturer assumes that a user, such as a mechanic or vehicle technician, is interested in obtaining for analysis and troubleshooting of a vehicle. For example, in at least one embodiment, the Presets Options Menu 560 displays options for selecting Tire Information 570, options for selecting Electric Vehicles (EV) Battery Health Information 580, and Other menu options 590. The Presets Options Menu 560 uses preset settings to generate the vehicle information without the user selecting individual information.

Figure 6:
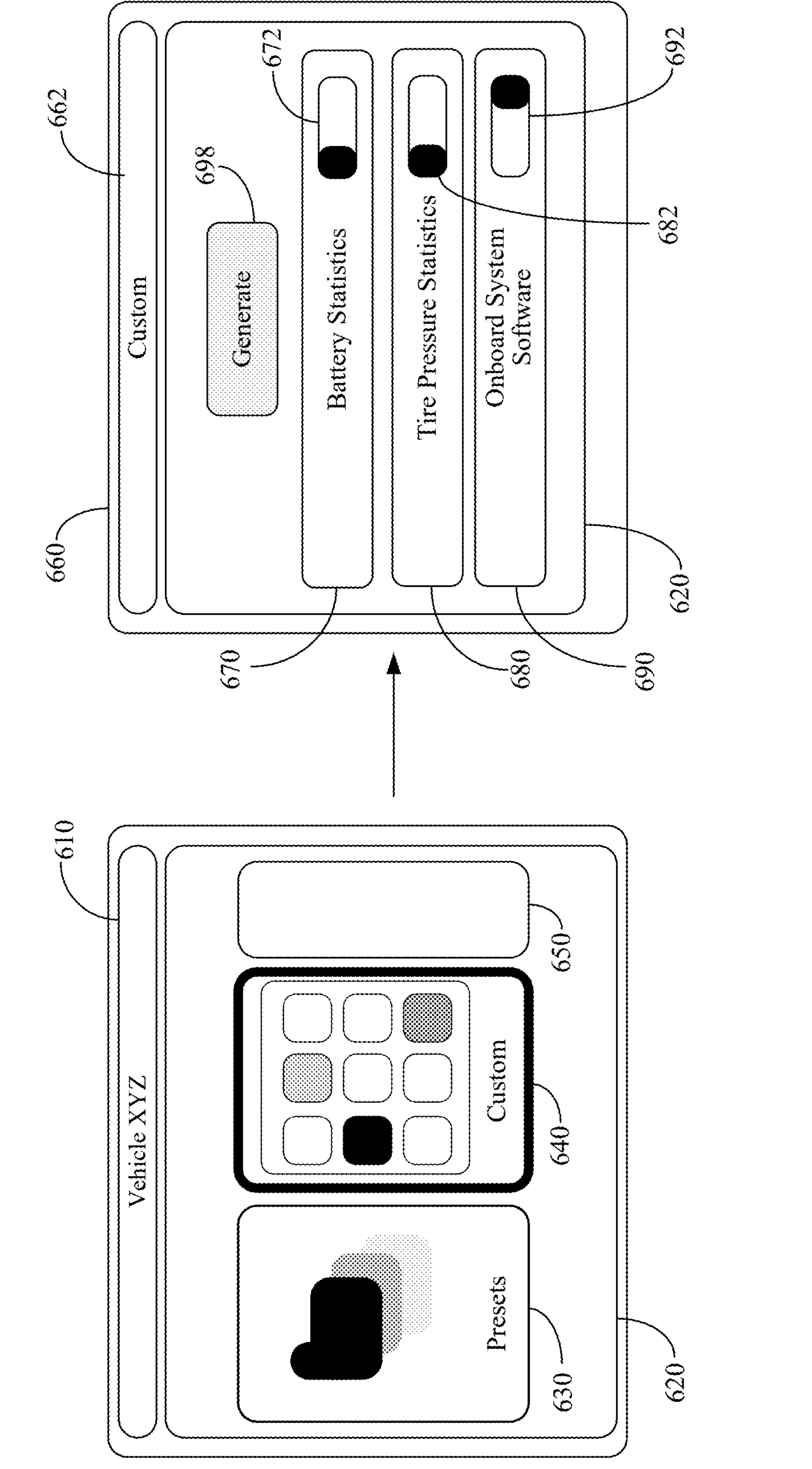
FIG. 6 illustrates a transition to a Custom Menu according to at least one embodiment.

FIG. 6 illustrates a transition to a Custom Menu 600 according to at least one embodiment.

In FIG. 6, the Custom Generation Menu 630 is shown selected as represented by the border of the Custom Generation Menu 630 being highlighted. Title Bar 610 indicates a menu for Vehicle XYZ. Within Display Area 620, a Presets Generation Menu 630 is displayed as being unselected for displaying the Presents Options Menu 560. Display Area 620 also shows other menu options 650.

Upon selection of Custom Generation Menu 640, Custom Options Menu 660 is displayed. Custom Options Menu 660 includes a Title Bar 662 identifying navigation to the menu for selection of custom information. Custom Options Menu 660 includes Display Area 620 of Custom Options Menu 660 showing individual information that is selectable for generation of customized vehicle information.

Custom Options Menu 660 allows a user to select individual information as desired, such as a menu to select Battery Statistics 670, Tire Pressure Statistics 680, Onboard System Software information 690, and the like. Each of the options, e.g., Battery Statistics 670, Tire Pressure Statistics 680, Onboard System Software information 690, include respective Toggle Buttons 672, 682, 692 for selection of each option. In FIG. 6, Toggle Button 672 shows that Battery Statistics 670 is not selected, and Toggle Button 682 shows that Tire Pressure Statistics 680 is not selected. Toggle Button 692 shows that Onboard System Software information 690 is selected. Upon selection of Generate Button 698, vehicle information associated with Onboard System Software information 690 is generated.

Figure 7:
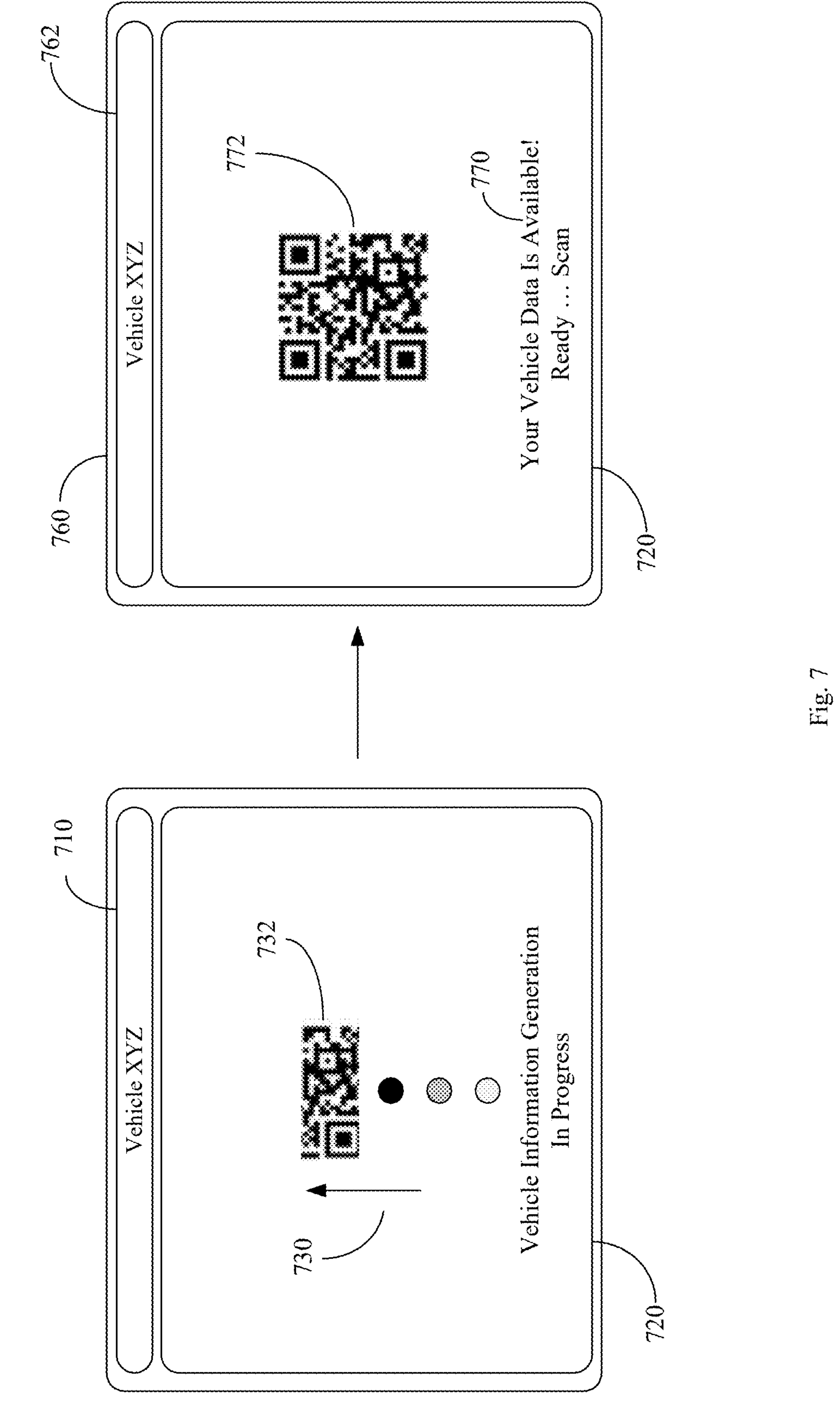
FIG. 7 shows a Status Display according to at least one embodiment.

FIG. 7 shows a Status Display 700 according to at least one embodiment.

Status Display 700 is displayed after selecting to generate Preset information as illustrated in Presets Options Menu 560 in FIG. 5, or after selection of the Generate Button 698 in Custom Options Menu 660. In FIG. 7, Title Bar 710 shows vehicle information is being obtained for Vehicle XYZ. Display Area 720 shows vehicle information generation is in progress. Indicator Lights and Arrow 730 shows the vehicle information generation is being obtained. A partial code 732, such as a partial two dimensional barcode, is displayed. Status Display 700 shows that vehicle information generation is being validated and the vehicle information is in process of being downloaded.

After the selected vehicle information has been downloaded, Status Display 760 is displayed. Status Display 760 includes Title Bar 762 that identifies vehicle information was obtained for Vehicle XYZ. Display Area 720 identifies the Vehicle Data is Available for Scanning 770 using code 772. Code 772 is either a two dimensional barcode or any other code that is able to be displayed with vehicle information embedded therein. The two dimensional barcode is presented to the user in Display Area 720 where the user is able to take a screenshot of two dimensional barcodes or to scan the two dimensional barcode.

Other features are also able to be implemented. For example, the user is able to select predetermined vehicle information on the input and output device or input vehicle information which the user wishes to acquire. The user is authenticated and the user request input by an authenticated user is accepted.

In response to the user managing a lot of vehicles, the user is able to trigger the collection of information and the generation of the two dimensional barcode in different vehicles using Presets Options Menu 560 or Custom Options Menu 660 without waiting for the two dimensional barcode to be generated. The user is then able to scan the two dimensional barcodes individually after the two dimensional barcode is generated rather than the user connecting physically to each vehicle to download the vehicle information.

Thus, the infotainment system presents a user interface that allows the user to generate the information of the vehicle. With the Presets Options Menu 560, the user does not have to select the individual information, but instead receives preset information. The Custom Options Menu 660 allows the user to select individual types of information of interest to the user. The generated vehicle information is a snapshot of vehicle information and does not represent live data. In response to a user managing many vehicles, the user is able to trigger this process in different vehicles, and then collect the information one by one after the vehicle information is generated for each vehicle.

Figure 8:
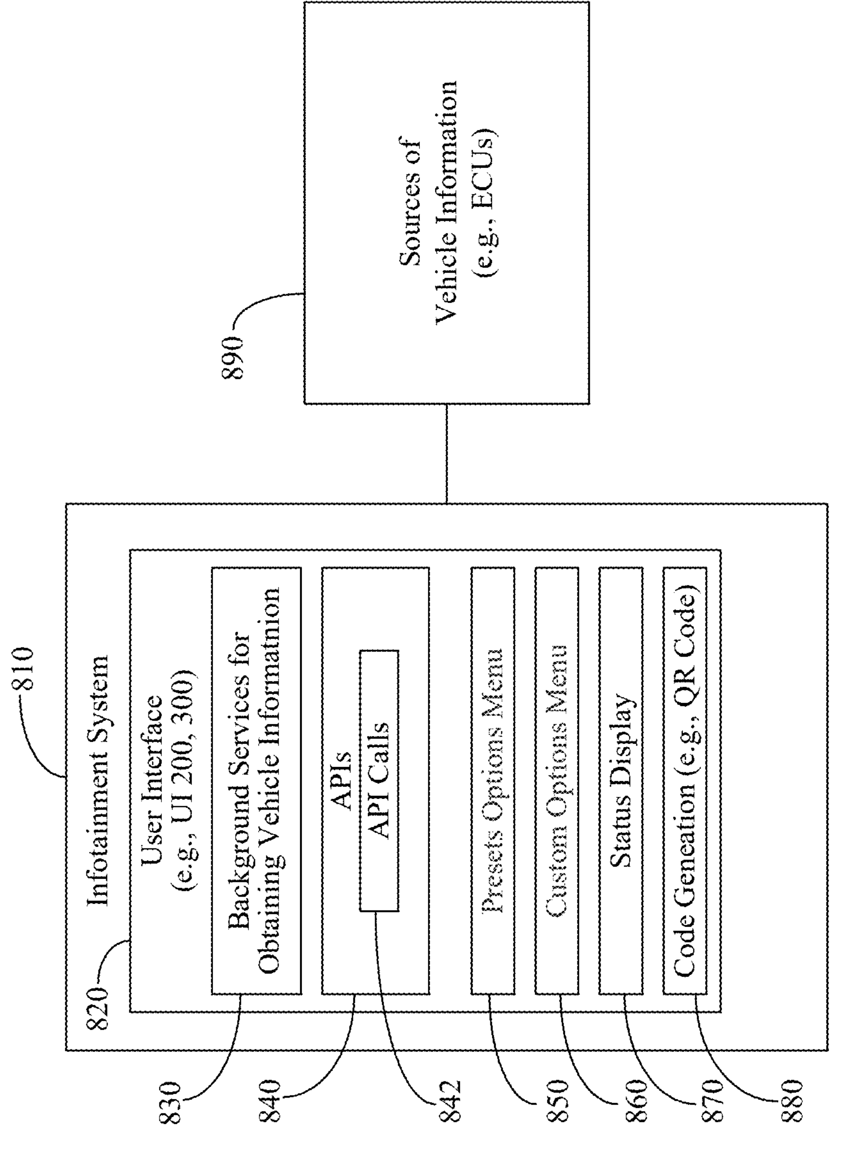
FIG. 8 illustrates a software stack for acquiring vehicle information using generated code according to at least one embodiment.

FIG. 8 illustrates a software stack 800 for acquiring vehicle information using generated code according to at least one embodiment.

In FIG. 8, an Infotainment System 810 includes User Interfaces 820, such as User Interfaces 300, 300. Infotainment System 810 includes any type of infotainment system of a vehicle having an interactive display. With new models of vehicles, the architecture of different vehicles is different. The current solution of using OBD does not allow data generations with evolving architectures. A copy Software Developer Kit (SDK) is provided and is able to evolve in response to changing architectures.

The user interacts with User Interface 820 of the Infotainment System 810, wherein User Interface 820 interacts with the software. The software then interacts with the proper Source of Vehicle Information 890.

Software handles the communication mechanism with ECUs and also provides User Interface 820. Different software tools and mechanisms are provided together in a Software Developer Kit (SDK). The User Interface 820 runs in the background and interacts with Background Services 830 that gathers the data from the different ECUs. User Interface 820 interacts with APIs 840 that include a list of API Calls 842. Developers update the User Interface 820 to be relevant to each vehicle, identify the API Calls 842, and group the information in the generated Code 880, e.g., a two dimensional barcode. The developer refers to the collection of API Calls 842 that are within the SDK.

The software is a stack of different applications controlled through User Interface 820. The different Background Services 830 gather the vehicle information from the Sources of Vehicle Information 890. The User Interface 820 is actually communicating with Background Services 830 that runs in the background. Background Services 830 makes the different API Calls 842 to the different Sources of Vehicle Information 890, e.g., at least one electronic control unit (ECU). While the Background Services 830 are generating the vehicle information, User Interface 820 displays Status Display 870. Once the different data is collected, the Background Services 830 answer back to User Interface 820 in Status Display 870 to communicate that the vehicle information has been collected and is available.

User Interface 820 obtains the data and generates the two dimensional barcode 880, which is displayed in Status Display 870. Background Services 830 communicate with the appropriate ECUs or other components to retrieve the relevant vehicle information. For example, Background Services 830 are able to communicate with the appropriate ECUs via the API Calls 842.

Each of the Sources of Vehicle Information 890, e.g., ECU, provides different information and the generated two dimensional barcode 880 has the actual information embedded therein. The vehicle information in the generated two dimensional barcode 880 is able to be encrypted or non-encrypted. For example, the vehicle information is able to be encrypted and arranged in a predetermined format. The system knows what information is available for retrieval. Interfaces with Background Services 830 provide API Calls 842 to the Sources of Vehicle Information 890. The API Calls 842 includes details about the information that is available. Developers are able to update User Interface 820 and API Calls 842 to be relevant to the actual information available for each vehicle.

A developer creates User Interface 820 with the different types of vehicle information and groups the types of vehicle information together as presets selected in Presets Options Menu 850 or Custom Options Menu 860 by referring to the collection of API Calls 842 that are within the SDK.

The vehicle information that is generated is dependent on the capacity of the generated Code 880, e.g., a two dimensional barcode. For example, in at least one embodiment, the capacity of the two dimensional barcode is 8 kilobytes. However, embodiments described herein are not meant to be limited to such capacity. Also, other codes are able to be used with different capacity capabilities. Different two dimensional barcodes are able to be cached and a sequence of two dimensional barcodes are able to be presented. Alternatively, the generated vehicle data is able to be compressed to increase capacity. Also, real-time information is able to be gathered in real-time according to at least one embodiment, e.g., using a smart phone. The generated two dimensional barcode 880 is able to be updated or refreshed periodically to represent the current information.

For example, in response to displaying information on a smart phone, the smartphone is going to be interacting with the Infotainment System 810 and ongoing communication with the Background Services 830 occurs to retrieve the current information on a regular basis.

According to at least one embodiment, the vehicle is able to serve the data to a local server, wherein the user is able to connect directly with the vehicle via a computer, e.g., through a web browser. However, this raises security concerns because of the nature of Wi-Fi and wired connections to a computer.

An advantage is provided in response to a user wanting to collect data of a fleet of vehicles. The information retrieval is able to be triggered one vehicle at the time, but the collection and the generation of the two dimensional barcode 880 is able to be obtain upon availability of the two dimensional barcode. In comparison, with OBD, the user plugs a cable into each individual vehicle and waits for the data to transfer. Thus, according to at least one embodiment, the operation is able to be started on each vehicle and the user does not have to wait until the information is ready to start the operation on the next vehicle. The information is able to then be collected at once in quick succession.

Figure 9:
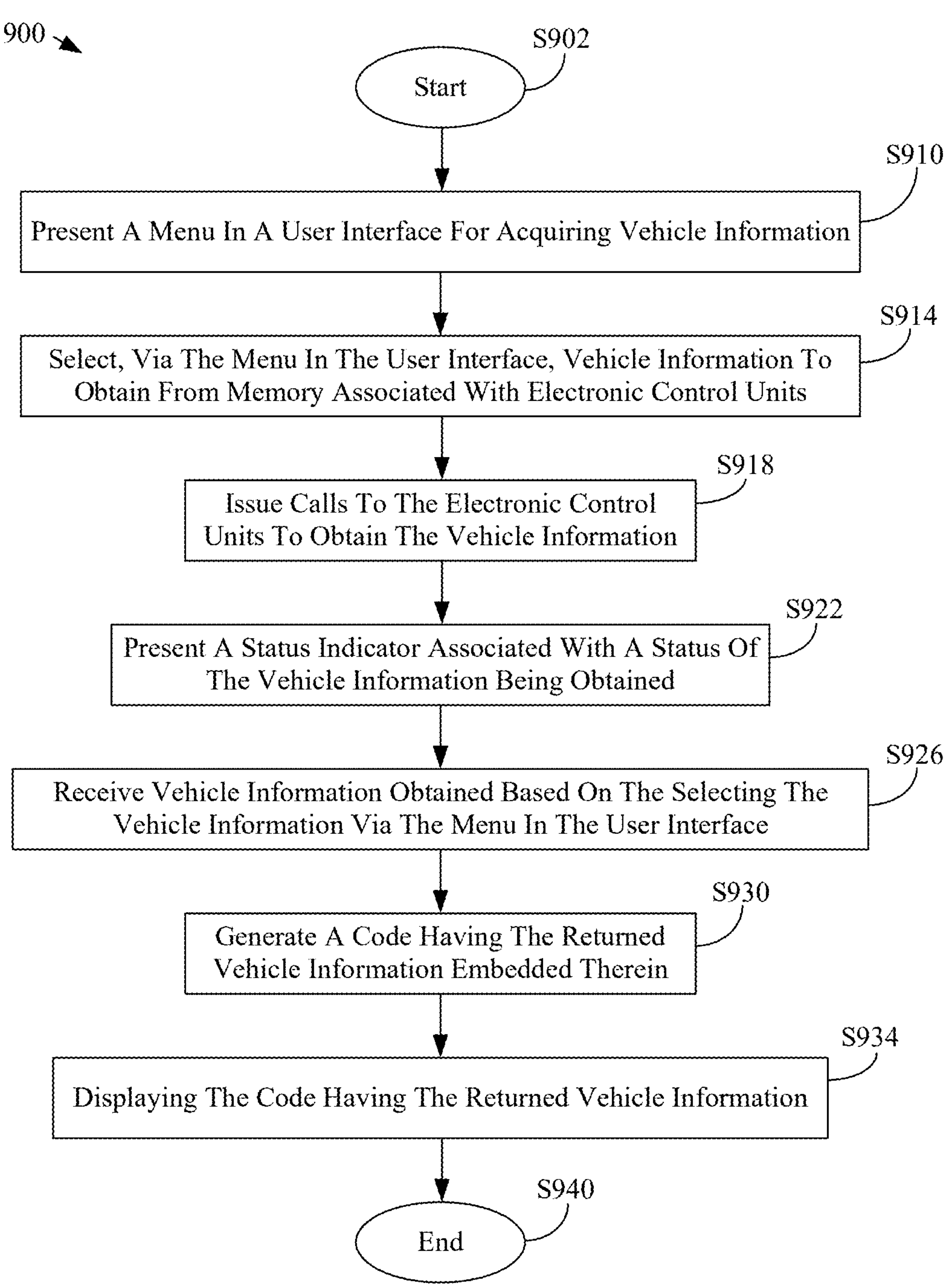
FIG. 9 is a flowchart of a method for acquiring vehicle information according to at least one embodiment.

FIG. 9 is a flowchart 900 of a method for acquiring vehicle information according to at least one embodiment.

In FIG. 9, the method starts S902 and a menu is presented in a user interface for acquiring vehicle information S910. Referring to FIG. 2, within Display Area 220, a Vehicle Information Generation Menu 230 is displayed for selecting to generate vehicle information. Referring to FIG. 3, within Display Area 320, Vehicle Information Generation Menu 330 is shown being selected (as represented by the border being highlighted) for initiating generation of vehicle information.

Vehicle information is selected, via the menu in the user interface, to obtain from memory associated with electronic control units S914. Referring to FIG. 4, within Display Area 420, a Presets Generation Menu 430 is displayed for selection by a user to generate vehicle information in a code, such as a two dimensional barcode, based on preset parameters. A Custom Generation Menu 440 is displayed for selection by a user to generate vehicle information, in a code, such as a two dimensional barcode, based on selection of custom parameters.

Referring to FIG. 5, within Display Area 520, a Presets Generation Menu 530 is displayed as being selected for displaying the Presets Options Menu 560. Upon selection of Presets Generation Menu 530, Presets Options Menu 560 is displayed. Presets Options Menu 560 includes Display Area 520 of Presets Options Menu 560 showing a collection of preestablished information that the manufacturer assumes that a user, such as a mechanic or vehicle technician, is interested in obtaining for analysis and troubleshooting of a vehicle. For example, in at least one embodiment, the Presets Options Menu 560 displays options for selecting Tire Information 570, for selecting Electric Vehicles (EV) Battery Health Information, and Other menu options 590. The Presets Options Menu 560 uses preset settings to generate the vehicle information without the user selecting individual information.

Referring to FIG. 6, within Display Area 620, a Presets Generation Menu 630 is displayed as being unselected for displaying the Presents Options Menu 560. Upon selection of Custom Generation Menu 640, Custom Options Menu 660 is displayed. Custom Options Menu 660 includes Display Area 620 of Custom Options Menu 660 showing individual information that is selectable for generation of customized vehicle information. Custom Options Menu 660 allows a user to select individual information as desired, such as a menu to select Battery Statistics 670, Tire Pressure Statistics 680, Onboard System Software information 690, and the like. Each of the options, e.g., Battery Statistics 670, Tire Pressure Statistics 680, Onboard System Software information 690, include respective Toggle Buttons 672, 682, 692 for selection of each option. In FIG. 6, Toggle Button 672 shows that Battery Statistics 670 is not selected, and Toggle Button 682 shows that Tire Pressure Statistics 680 is not selected. Toggle Button 692 shows that Onboard System Software information 690 is selected. Upon selection of Generate Button 698, vehicle information associated with Onboard System Software information 690 is generated.

Calls to the electronic control units are issued to obtain the vehicle information S918. Referring to FIG. 8, the User Interface 820 runs in the background and interacts with Background Services 830 that gather the data from the different ECUs. User Interface 820 interacts with APIs 840 that include a list of API Calls 842. The User Interface 820 communicates with Background Services 830 that run in the background. Background Services 830 makes the different API Calls 842 to the different Sources of Vehicle Information 890. Interfaces with Background Services 830 provide API Calls 842 to the Sources of Vehicle Information 890. The API Calls 842 include details about the information that is available. Developers are able to update User Interface 820 and API Calls 842 to be relevant to the actual information available for each vehicle. A developer creates User Interface 820 with the different types of vehicle information and groups the types of vehicle information together as presets selected in Presets Options Menu 850 or Custom Options Menu 860 by referring to the collection of API Calls 842 that are within the SDK.

A status indicator associated with a status of the vehicle information being obtained is presented S922. Referring to FIG. 7, Status Display 700 is displayed after selecting to generate Preset information as illustrated in Presets Options Menu 560 in FIG. 5, or after selection of the Generate Button 698 in Custom Options Menu 660. Display Area 720 shows vehicle information generation is in progress. Indicator Lights and Arrow 730 shows the vehicle information generation is being obtained. A partial code 732, such as a partial two dimensional barcode, is displayed. Status Display 700 shows that vehicle information generation is being validated and the vehicle information is in process of being downloaded. After the selected vehicle information has been downloaded, Status Display 760 is displayed.

Vehicle information obtained based on the selecting the vehicle information via the menu in the user interface is received S926. Referring to FIG. 7, after the selected vehicle information has been downloaded, Status Display 760 is displayed. Status Display 760 includes Title Bar 762 that identifies vehicle information was obtained for Vehicle XYZ. Display Area 720 identifies the Vehicle Data is Available for Scanning 770 using code 772.

A code is generated having the returned vehicle information embedded therein S930. Referring to FIG. 8, Background Services 830 makes the different API Calls 842 to the different Sources of Vehicle Information 890, e.g., one or more electronic control units (ECUs). While the Background Services 830 are generating the vehicle information, User Interface 820 displays Status Display 870. Once the different data is collected, the Background Services 830 answer back to User Interface 820 in Status Display 870 to communicate that the vehicle information has been collected and is available. User Interface 820 obtains the data and generates the two dimensional barcode 880, which is displayed in Status Display 870.

The code having the returned vehicle information is displayed S934. Referring to FIG. 7, Display Area 720 identifies the Vehicle Data is Available for Scanning 770 using code 772. Code 772 is either a two dimensional barcode or any other code that is able to be displayed with vehicle information embedded therein. The two dimensional barcode is presented to the user in Display Area 720 where the user is able to take a screenshot of two dimensional barcodes or to scan the two dimensional barcode.

The process then terminates S940.

At least one embodiment of the method for acquiring vehicle information includes presenting a menu in a user interface of an infotainment system of a vehicle for acquiring vehicle information, selecting, via the menu, vehicle information to obtain from a memory associated with at least one electronic control unit of a vehicle, receiving vehicle information obtained based on the selecting the vehicle information, generating a code having the vehicle information embedded therein, and displaying the code having the vehicle information embedded therein.

Figure 10:
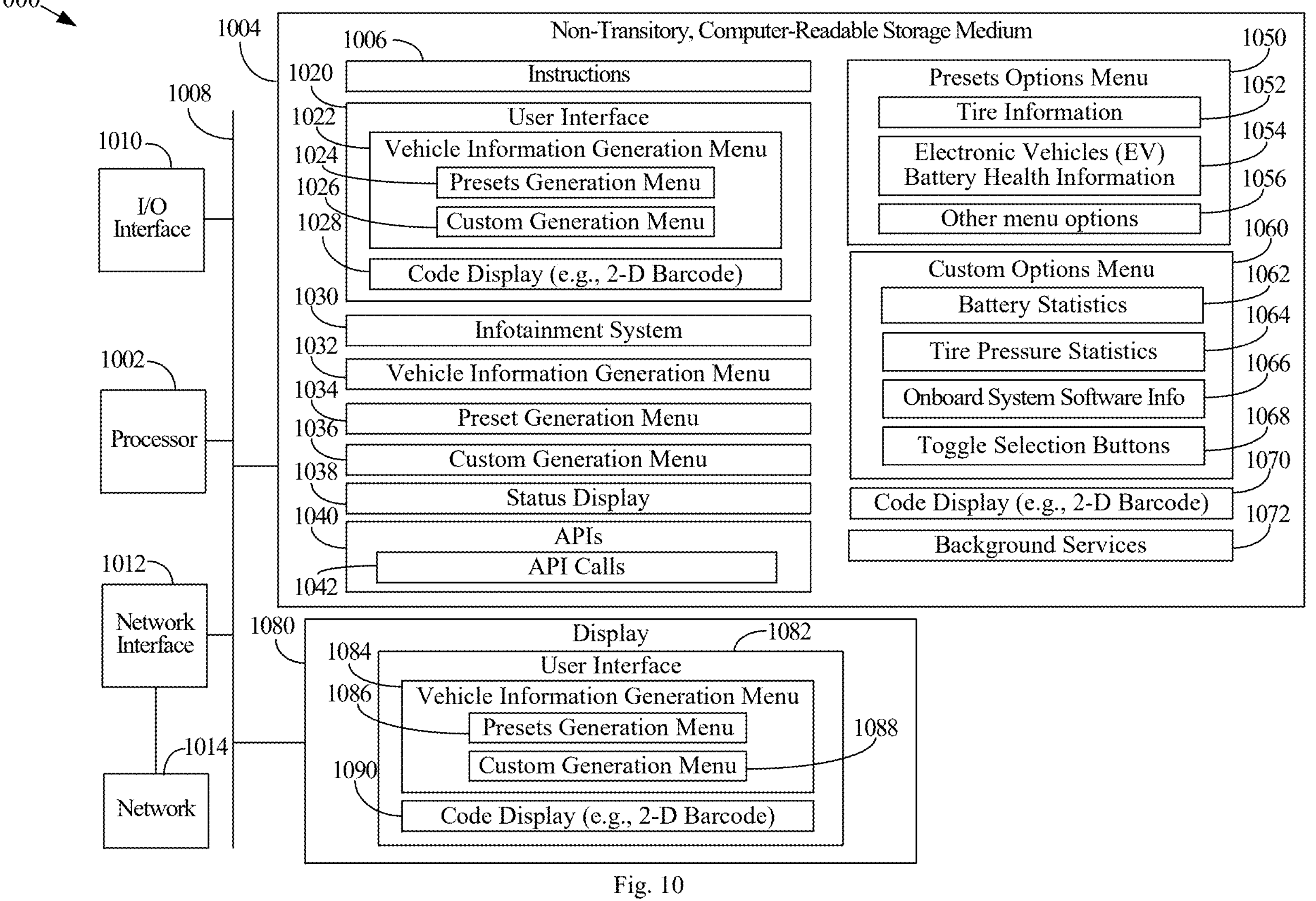
FIG. 10 is a high-level functional block diagram of a processor-based system according to at least one embodiment.

FIG. 10 is a high-level functional block diagram of a processor-based system 1000 according to at least one embodiment.

In at least one embodiment, processing circuitry 1000 acquires vehicle information and displays the acquired vehicle information in a code, such as a two dimensional barcode.

Processing circuitry 1000 implements a method for acquiring vehicle information and displaying the acquired vehicle information in a code using Processor 1002. Processing circuitry 1000 also includes a Non-Transitory, Computer-Readable Storage Medium 1004 that is used to implement the acquisition of vehicle information and the display of the acquired vehicle information in a code. Non-Transitory, Computer-Readable Storage Medium 1004, amongst other things, is encoded with, i.e., stores, Instructions 1006, i.e., computer program code, that are executed by Processor 1002 causes Processor 1002 to perform operations for acquiring vehicle information and displaying the acquired vehicle information in a code. Execution of Instructions 1006 by Processor 1002 represents (at least in part) an application which implements at least a portion of the methods described herein in accordance with one or more embodiments (hereinafter, the noted processes and/or methods).

Processor 1002 is electrically coupled to Non-Transitory, Computer-Readable Storage Medium 1004 via a Bus 1008. Processor 1002 is electrically coupled to an Input/Output (I/O) Interface 1010 by Bus 1008. A Network Interface 1012 is also electrically connected to Processor 1002 via Bus 1008. Network Interface 1012 is connected to a Network 1014, so that Processor 1002 and Non-Transitory, Computer-Readable Storage Medium 1004 connect to external elements via Network 1014. Processor 1002 is configured to execute Instructions 1006 encoded in Non-Transitory, Computer-Readable Storage Medium 1004 to cause processing circuitry 1000 to be usable for performing at least a portion of the processes and/or methods. In one or more embodiments, Processor 1002 is a Central Processing Unit (CPU), a multi-processor, a distributed processing system, an Application Specific Integrated Circuit (ASIC), and/or a suitable processing unit.

Processing circuitry 1000 includes I/O Interface 1010. I/O interface 1010 is coupled to external circuitry. In one or more embodiments, I/O Interface 1010 includes a keyboard, keypad, mouse, trackball, trackpad, touchscreen, and/or cursor direction keys for communicating information and commands to Processor 1002.

Processing circuitry 1000 also includes Network Interface 1012 coupled to Processor 1002. Network Interface 1012 allows processing circuitry 1000 to communicate with Network 1014, to which one or more other computer systems are connected. Network Interface 1012 includes wireless network interfaces such as Bluetooth, Wi-Fi, Worldwide Interoperability for Microwave Access (WiMAX), General Packet Radio Service (GPRS), or Wideband Code Division Multiple Access (WCDMA); or wired network interfaces such as Ethernet, Universal Serial Bus (USB), or Institute of Electrical and Electronics Engineers (IEEE) 864.

Processing circuitry 1000 is configured to receive information through I/O Interface 1010. The information received through I/O Interface 1010 includes one or more of instructions, data, design rules, libraries of cells, and/or other parameters for processing by Processor 1002. The information is transferred to Processor 1002 via Bus 1008. Processing circuitry 1000 is configured to receive information related to a User Interface (UI) 1022 through I/O Interface 1010. The information is stored in Non-Transitory, Computer-Readable Storage Medium 1004 as UI 1022.

In one or more embodiments, one or more Non-Transitory, Computer-Readable Storage Medium 1004 having stored thereon Instructions 1006 (in compressed or uncompressed form) that may be used to program a computer, processor, or other electronic device) to perform processes or methods described herein. The one or more Non-Transitory, Computer-Readable Storage Medium 1004 includes one or more of an electronic storage medium, a magnetic storage medium, an optical storage medium, a quantum storage medium, or the like.

For example, the Non-Transitory, Computer-Readable Storage Medium 1004 may include, but are not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. In one or more embodiments using optical disks, the one or more Non-Transitory Computer-Readable Storage Media 1004 includes a Compact Disk-Read Only Memory (CD-ROM), a Compact Disk-Read/Write (CD-R/W), and/or a Digital Video Disc (DVD).

In one or more embodiments, Non-Transitory, Computer-Readable Storage Medium 1004 stores Instructions 1006 configured to cause Processor 1002 to perform at least a portion of the processes and/or methods for acquiring vehicle information and displaying the acquired vehicle information in a code. In one or more embodiments, Non-Transitory, Computer-Readable Storage Medium 1004 also stores information, such as algorithm which facilitates performing at least a portion of the processes and/or methods for acquiring vehicle information and displaying the acquired vehicle information in a code.

Accordingly, in at least one embodiment, Processor 1002 executes Instructions 1006 stored on the one or more Non-Transitory, Computer-Readable Storage Medium 1004 to implement the acquisition of vehicle information and the displaying of the acquired vehicle information in a code. Processor 1002 implements a User Interface 1020 for Infotainment System 1030. Infotainment System 1030 includes any type of infotainment system of a vehicle having an interactive display. Processor 1002 is configured to provide Vehicle Information Generation Menu 1022 in User Interface 1020. Processor 1002 is further configured to provide Vehicle Information Generation Menu 1022 with a Presets Generation Menu 1024 and a Custom Generation Menu 1026. Processor 1002 receives vehicle information and displays Code Display (e.g., a two dimensional barcode) 1028 in User Interface 1020. Process 1002 implements Vehicle Information Generation Menu 1032 for selecting to acquire vehicle information and presents a code, such as a two dimensional barcode, in Code Display 1028 once the vehicle information is received. Processor 1002 implements Presets Generation Menu 1034 for presenting Presets Options Menu 1050 for selection by a user to generate vehicle information in a code, such as a two dimensional barcode, based on preset parameters. Processor 1002 implements Custom Generation Menu 1036 for presenting Custom Options Menu 1060 for selection of custom parameters by a user to generate vehicle information, in a code, such as a two dimensional barcode, based on the selection of the custom parameters. Processor 1002 implements Presets Options Menu 1050 to show a collection of preestablished information a user is interested in obtaining for analysis and troubleshooting of a vehicle. Presets Options Menu 1050 includes Tire Information 1052, Electric Vehicles (EV) Battery Health Information 1054, and Other Menu Options 1056. Processor 1002 implements Custom Options Menu 1060 to show individual information that is selectable for generation of customized vehicle information. Custom Options Menu 1060 includes Battery Statistics 1062, Tire Pressure Statistics 1064, Onboard System Software information 1066, as well as Toggle Buttons 1068 for selection of each option 1062, 1064, 1066. Processor 1002 implements Status Display 1038 to show vehicle information generation in progress. Processor 1002 implements Background Services 1072 that interact with Sources of Vehicle Information to gather Vehicle Information from the different Sources of Vehicle Information. Processor 1002 implements APIs 1040 for API Calls 1042 made by Background Services 1072 to the different Sources of Vehicle Information to retrieve the vehicle information according to the selection of Preset Generation Menu 1034 or custom selections in Custom Generation Menu 1036. Once the vehicle information has been obtained, Processor 1002 presents a code in Code Display (e.g., a two dimensional barcode) 1070, wherein the code includes the obtained vehicle information. Processor 1002 presents a User Interface 1082 using Display 1080. User Interface 1082 presents a Vehicle Information Generation Menu 1084 to enable a user to select vehicle information to acquire from data sources of the vehicle. Vehicle Information Generation Menu 1084 further includes a Presets Generation Menu 1086 and Custom Generation Menu 1088. Presets Generation Menu 1086 presents preset parameters generating vehicle information in a code, such as a two dimensional barcode, based on preset parameters. Custom Generation Menu 1088 presents a custom options menu for selection of custom parameters by a user to generate vehicle information, in a code, such as a two dimensional barcode, based on the selection of the custom parameters. Once the vehicle information has been obtained, a Code Display 1090 presents a code, e.g., a two dimensional barcode, wherein the code includes the obtained vehicle information.

Embodiments described herein provide a method that provides one or more advantages. For example, an Infotainment System provides menus for a user to select vehicle information to acquire. A Presets Menu allows a user to acquire a collection of preset information. A Custom Menu allows a user to select from a listing of parameters vehicle information to acquire. Once the information has been obtained, a code is generated and presented on a display, wherein the code includes the acquired vehicle information. Further, the operation is able to be started on each of a plurality of vehicles, such as in a vehicle fleet, and the user does not have to wait until information on a first vehicle is obtained before triggering acquisition of vehicle information on subsequent vehicles. The information is able to then be collected from each vehicle at once in quick succession. Separate instances of these programs can be executed on or distributed across any number of separate computer systems. Thus, although certain steps have been described as being performed by certain devices, software programs, processes, or entities, this need not be the case. A variety of alternative implementations will be understood by those having ordinary skill in the art.

Additionally, those having ordinary skill in the art readily recognize that the techniques described above can be utilized in a variety of devices, environments, and situations. Although the embodiments have been described in language specific to structural features or methodological acts, the subject matter defined in the appended claims is not necessarily limited to the specific features or acts described. Rather, the specific features and acts are disclosed as exemplary forms of implementing the claims.

What is claimed is:

1. A method for acquiring vehicle information, comprising:

presenting a menu in a user interface of an infotainment system of a vehicle for acquiring vehicle information; selecting, via the menu, vehicle information to obtain from a memory associated with at least one electronic control unit of a vehicle;

receiving vehicle information obtained based on the selecting the vehicle information;

generating a code having the vehicle information embedded therein; and displaying the code having the vehicle information embedded therein, wherein the presenting the menu includes presenting a custom menu having at least one selectable vehicle information type for selection to download the vehicle information associated with the at least one selectable vehicle information type, wherein the presenting the custom menu includes presenting a toggle button associated with each of the at least one selectable vehicle information type for selecting one or more of the at least one selectable vehicle information type.

2. The method of claim 1, wherein the presenting the menu includes presenting a preset menu having a batch of information prepared in advance for selection for downloading.

3. The method of claim 1, wherein the presenting the menu includes presenting a status indicator associated with progress of the vehicle information being obtained.

4. The method of claim 1, wherein the code includes a two dimensional barcode.

5. The method of claim 1, wherein the selecting, via the menu in the user interface, vehicle information to obtain from the memory associated with the at least one electronic control unit includes presenting a status indicator associated with a status of the vehicle information being obtained.

6. A system for acquiring vehicle information, comprising: a memory storing computer-readable instructions; and a processor connected to the memory, wherein the processor is configured to execute the computer-readable instructions to perform operations to: present a menu of an infotainment system of a vehicle for acquiring vehicle information; receive, via the menu, a selection of vehicle information to obtain from memory associated with at least one electronic control unit; receive vehicle information obtained based on the selection of the vehicle information; generate a code having the vehicle information embedded therein; and displaying the code having the vehicle information embedded therein, wherein the menu is a custom menu presenting at least one selectable vehicle information type for selection to download the vehicle information associated with the at least one selectable vehicle information type, wherein the custom menu includes a toggle button associated with each of the at least one selectable vehicle information type for selecting one or more of the at least one selectable vehicle information type.

7. The system of claim 6, wherein the menu is a preset menu presenting a batch of information prepared in advance for selection for downloading.

8. The system of claim 6, wherein the menu presents a status indicator associated with a status of the vehicle information being obtained.

9. The system of claim 6, wherein the code includes a two-dimensional barcode.

10. The system of claim 6, wherein the processor is configured to present a status indicator associated with a status of the vehicle information being obtained.

11. A non-transitory computer-readable media having computer-readable instructions stored thereon, which when executed by a processor causes the processor to perform operations comprising: presenting a menu in a user interface of an infotainment system of a vehicle for acquiring vehicle information; selecting, via the menu, vehicle information to obtain from memory associated with at least one electronic control unit; receiving vehicle information obtained based on the selecting the vehicle information; generating a code having the vehicle information embedded therein; and displaying the code having the vehicle information embedded therein, wherein the presenting the menu includes presenting a custom menu having at least one selectable vehicle information type for selection to download the vehicle information associated with the at least one selectable vehicle information type, wherein the presenting the custom menu includes presenting a toggle button associated with each of the at least one selectable vehicle information type for selecting one or more of the at least one selectable vehicle information type.

12. The non-transitory computer-readable media of claim 11, wherein the presenting the menu includes presenting a preset menu having a batch of information prepared in advance for selection for downloading.

13. The non-transitory computer-readable media of claim 11, wherein the presenting the menu includes presenting a status indicator associated with progress of the vehicle information being obtained.

14. The non-transitory computer-readable media of claim 11, wherein the code includes a two dimensional barcode.

15. The non-transitory computer-readable media of claim 11, wherein the selecting, via the menu in the user interface, vehicle information to obtain from memory associated with the at least one electronic control unit includes presenting a status indicator associated with a status of the vehicle information being obtained.

* * * * *